(12) United States Patent
Hao et al.

(10) Patent No.: US 12,541,811 B2
(45) Date of Patent: Feb. 3, 2026

(54) TILE-BASED PRIMITIVE RENDERING METHOD AND APPARATUS ACCORDING TO LANE MASKS, COMPUTER DEVICE AND STORAGE MEDIUM

(71) Applicant: Glenfly Tech Co., Ltd., Shanghai (CN)

(72) Inventors: Wenlin Hao, Shanghai (CN); Fengxia Wu, Shanghai (CN)

(73) Assignee: GLENFLY TECH CO., LTD., Shanghai (CN)

( * ) Notice: Subject to any disclaimer, the term of this patent is extended or adjusted under 35 U.S.C. 154(b) by 202 days.

(21) Appl. No.: 18/371,250

(22) Filed: Sep. 21, 2023

(65) Prior Publication Data
US 2024/0233263 A1    Jul. 11, 2024

(30) Foreign Application Priority Data

Jan. 6, 2023   (CN) .......................... 202310016480.X

(51) Int. Cl.
*G06T 1/20*   (2006.01)
*G06T 1/60*   (2006.01)
(Continued)

(52) U.S. Cl.
CPC .................. *G06T 1/20* (2013.01); *G06T 1/60* (2013.01); *G06T 11/001* (2013.01); *G06T 17/10* (2013.01)

(58) Field of Classification Search
None
See application file for complete search history.

(56) References Cited

U.S. PATENT DOCUMENTS

2012/0081370 A1   4/2012   Min et al.
2015/0049107 A1   2/2015   Park
(Continued)

FOREIGN PATENT DOCUMENTS

| CN | 102096897 A | 6/2011 |
|----|-------------|--------|
| CN | 104715443 A | 6/2015 |

(Continued)

OTHER PUBLICATIONS

Kun et al. "A 3D Geometric Primitive Picking Method on GPU by Positional Relation Judgment." Journal of Graphics 36.2: 262 (2015) [English Abstract Provided].
(Continued)

*Primary Examiner* — Zhengxi Liu
(74) *Attorney, Agent, or Firm* — NIXON PEABODY LLP

(57) ABSTRACT

Disclosed are a primitive rendering method and apparatus, a computer device, and a storage medium. The method includes: receiving primitive information, determining a target tile in which a primitive is located according to the primitive information, obtaining tile-based information corresponding to the primitive; buffering the primitive information and the tile-based information; when a preset condition is satisfied, rendering a primitive in each target tile according to the primitive information and the tile-based information. With the present disclosure, there is no need to frequently exchange the color information with the system memory, and this is also no need to exchange the primitive tile-based information with the system memory, thereby effectively reducing the data interaction between the on-chip data of the GPU and the system memory.

12 Claims, 10 Drawing Sheets

(51) Int. Cl.
  *G06T 11/00* (2006.01)
  *G06T 17/10* (2006.01)

(56) References Cited

U.S. PATENT DOCUMENTS

| | | |
|---|---|---|
| 2017/0053375 A1* | 2/2017 | Bolz .................... G09G 5/363 |
| 2017/0337729 A1* | 11/2017 | Redshaw ............. G06T 15/405 |
| 2018/0137677 A1 | 5/2018 | Jeong et al. |
| 2020/0020153 A1* | 1/2020 | Sathe .................... G06T 15/005 |
| 2020/0184715 A1 | 6/2020 | Goswami et al. |
| 2020/0402217 A1 | 12/2020 | Golas et al. |
| 2021/0056036 A1* | 2/2021 | Breslow .............. G06F 12/0886 |
| 2021/0248806 A1* | 8/2021 | Yang ........................ G06T 1/20 |
| 2024/0169643 A1* | 5/2024 | Stepuch .................... G06F 9/50 |

FOREIGN PATENT DOCUMENTS

| | | |
|---|---|---|
| CN | 110209630 A | 9/2019 |
| CN | 110223216 A | 9/2019 |
| CN | 111062858 A | 4/2020 |
| CN | 111489282 A | 8/2020 |
| CN | 111882482 A | 11/2020 |
| CN | 112116518 A | 12/2020 |
| CN | 112991143 A | 6/2021 |
| CN | 113256477 A | 8/2021 |
| CN | 113553635 A | 10/2021 |
| CN | 114218887 A | 3/2022 |
| CN | 114996886 A | 9/2022 |
| CN | 115049531 A | 9/2022 |
| EP | 3471059 A1 | 4/2019 |
| EP | 3664037 A1 | 6/2020 |
| EP | 3862979 A1 | 8/2021 |

OTHER PUBLICATIONS

Karsh et al. "Spatial vulnerability analysis for the first ply failure strength of composite laminates including effect of delamination." Composite Structures 184: 554-567 (2018).

Han et al. "Simulation of Multi Channel Optimization of Terrain Information," Computer Simulation 34.1 (2017) [English Abstract Provided].

CN Office Action for App. No. 202310016480.X, dated Mar. 13, 2024 (14 Pages).

* cited by examiner

| RT format<br>MSAA mode | 1x | 2x | 4x | 8x | 16x |
|---|---|---|---|---|---|
| 8bpp | 256x128 | 128x128 | 128x64 | 64x64 | 64x32 |
| 16bpp | 128x128 | 128x64 | 64x64 | 64x32 | 32x32 |
| 32bpp | 128x64 | 64x64 | 64x32 | 32x32 | 32x16 |
| 64bpp | 64x64 | 64x32 | 32x32 | 32x16 | 16x16 |
| 128bpp | 64x32 | 32x32 | 32x16 | 16x16 | 16x8 |

| Position information 0 | |
|---|---|
| Position information 1 | |
| ... | |
| ... | |
| ... | ... |
| Attribute information 11 | Attribute information 10 |
| Attribute information 01 | Attribute information 00 |

| context information 0 | first initial position | number | index | second initial position | attribute address |
|---|---|---|---|---|---|
| context information 1 | first initial position | number | index | second initial position | attribute address |
| ... | ... | ... | ... | ... | ... |
| context information 82 | first initial position | number | index | second initial position | attribute address |
| context information 83 | first initial position | number | index | second initial position | attribute address |

FIG. 9

TILE-BASED PRIMITIVE RENDERING METHOD AND APPARATUS ACCORDING TO LANE MASKS, COMPUTER DEVICE AND STORAGE MEDIUM

CROSS REFERENCES TO RELATED APPLICATION

The present application claims priority to Chinese patent application No. 202310016480.X, titled "Primitive Rendering Method and Apparatus, Computer Device and Storage Medium", and filed on Jan. 6, 2023, the content of which is hereby incorporated by reference in its entirety.

TECHNICAL FIELD

The present disclosure relates to the field of graphics processing unit technology, and particularly to a primitive rendering method and apparatus, a computer device and a storage medium.

BACKGROUND

The Graphics Processing Unit (GPU) is widely used in the graphics processing because of its powerful computing power. At present, there are two types of architectures for mainstream GPU products in the world: Immediate-Mode-Rendering (IMR) and Tile-Based-Rendering (TBR).

The IMR is an architecture adopted by the conventional GPUs. Each primitive to be rendered needs to pass through all stages of the rendering pipeline immediately, and needs to access the system memory at each stage. For example, it is required to read the content of the depth buffer at the depth test stage, and then write the content into the depth buffer after comparing the content with the pixel depth value. The same situation also occurs at the pixel blend stage; and it is also required to read the texture data from the system memory at the texture mapping stage. These read and write operations require very high bandwidth of the system memory. For rendering complex scenes, the bandwidth of the system memory is the most important factor affecting the performance of the GPU; and the frequent access to the system memory may greatly increase the power consumption.

In the TBR used by the mobile GPUs, all primitives to be rendered need to be temporarily stored in the system memory according to tiles where the primitives are located after the geometric transformation and clipping. Once one frame of primitives is stored, they can be rendered tile by tile according to an order of the tiles. Although such architecture can reduce the number of accesses to the system memory and the power consumption, the current API designs of both OpenGL and Direct3D are aimed at the IMR architecture, which are not adapted to the TBR architecture. The TBR architecture requires more complex hardware design and driver dispatch to achieve the above purpose.

SUMMARY

In view of this, as for the technical problem described above, it is necessary to provide a primitive rendering method and apparatus, a computer device, and a storage medium, to address the problem in the existing technology that the power consumption of the IMR architecture is higher, and the current API design is not adapted to the TBR architecture, so that the TBR architecture needs more complex hardware design and driver dispatch.

In the first aspect of the present disclosure, a primitive rendering method is provided, including:
receiving primitive information, determining a target tile in which a primitive is located according to the primitive information, obtaining tile-based information corresponding to the primitive;
caching the primitive information and the tile-based information;
when a preset condition is satisfied, rendering a primitive in each target tile according to the primitive information and the tile-based information.

In an embodiment, the primitive information includes position information;
the determining the target tile in which the primitive is located according to the primitive information includes:
tiling the primitive corresponding to the primitive information according to the position information and a tile size, determining the target tile in which the tiled primitive is located;
a screen for rendering the primitive includes a plurality of tiles pre-tiled, the tile size is obtained by calculating based on a size of an on-chip buffer, the number of render targets, a format of a tender target, and the number of sample points in a pixel.

In an embodiment, the primitive information includes position information and attribute information;
the caching the primitive information includes:
caching the position information according to a first order, caching the attribute information according to a second order, the first order and the second order being reversed.

In an embodiment, the tile-based information includes record information for recording the primitive covering the target tile;
the caching the tile-based information includes:
caching the record information by using a bitmask representation.

In an embodiment, the method further includes:
acquiring context information corresponding to the primitive information, the context information carrying a context attribute;
caching the context information.

In an embodiment, the rendering the primitive in each target tile according to the primitive information and the tile-based information includes:
searching for the primitive in each target tile according to the tile-based information;
acquiring context information corresponding to each primitive in each target tile in each target block, rendering the primitive in each target tile according to the primitive information and the context information of each primitive.

In an embodiment, the searching for the primitive in each target tile according to the tile-based information includes:
acquiring a corresponding target tile according to current tile-based information;
searching for tile-based information associated with the current tile-based information according to the target tile;
when there exists the tile-based information associated with the current tile-based information, obtaining a first operation result based on the current tile-based information and the associated tile-based information;
analyzing the first operation result to obtain the primitive in the target tile.

In an embodiment, the obtaining the first operation result based on the current tile-based information and the associated tile-based information includes:

performing an OR operation on the current tile-based information and the associated tile-based information to obtain the first operation result.

In an embodiment, the tile-based information further includes record information for recording a global primitive, the global primitive referring to a primitive having a coverage range more than a predetermined number of tiles;

the searching for the primitive in each target tile according to the tile-based information further includes:

searching for a global primitive associated with the target tile;

when there exists the global primitive associated with the target tile, obtaining the second operation result according to the first operation result and tile-based information corresponding to the global primitive;

analyzing the second operation result to obtain the primitive in the tile-based information.

In an embodiment, the obtaining the second operation result according to the first operation result and the tile-based information corresponding to the global primitive includes:

summing the first operation result and the tile-based information corresponding to the global primitive to obtain the second operation result.

In an embodiment, the acquiring the context information corresponding to each primitive in each target tile includes:

searching for index information of a primitive covering each target tile;

searching for a corresponding context index through the index information;

acquiring context information corresponding to each primitive according to the corresponding context index.

In an embodiment, the method further includes:

after caching the tile-based information and the primitive information, detecting whether any one of buffers corresponding to the primitive information and the tile-based information is full, or whether processing of a current frame is completed;

when one of the buffers corresponding to the primitive information and the tile-based information is full, or the processing of the current frame is completed, determining that the preset condition is satisfied.

In an embodiment, the method further includes:

when the primitive information changes, updating the tile-based information corresponding to the primitive information.

In the second aspect of the present disclosure, a primitive rendering apparatus is provided, including:

a classification module, configured to receive primitive information, determine a target tile in which a primitive is located according to the primitive information, and obtain tile-based information corresponding to the primitive;

a buffer module, configured to buffer the primitive information and the tile-based information;

a processing module, configured to render the primitive in each target tile according to the primitive information and the tile-based information when a preset condition is satisfied.

In the third aspect of the present disclosure, a computer device is provided, including a processor and a memory for storing a computer program, the processor, when executing the computer program, implements the method of any one of the above-mentioned embodiments.

In the fourth aspect of the present disclosure, a computer-readable storage medium is provided, on which a computer program is stored, when the computer program is executed by a processor, the method of any one of the above embodiments is implemented.

In the fifth aspect of the present disclosure, a computer program product is provided, including a computer program, when the computer program is executed by a processor, the method of any one of the above-mentioned embodiments is implemented.

The primitive rendering method and apparatus, the computer device, and the storage medium at least have the following advantages.

In the present disclosure, the primitive corresponding to the primitive information is tiled by tiles according to the received primitive information and then buffered; after the preset condition is satisfied, the buffered primitive is rendered by in tiles. With the present disclosure, there is no need to frequently exchange the color information with the system memory, and this is also no need to exchange the primitive tile-based information with the system memory, thereby effectively reducing the data interaction between the on-chip data of the GPU and the system memory. In addition, the technical solution of the present disclosure is based on the existing IMR architecture and can be implemented without the additional intervention of drivers, which is more adapted to the API designs of the OpenGL and Direct3D.

BRIEF DESCRIPTION OF THE DRAWINGS

The accompanying drawings which form a part of the present disclosure are intended to provide a further understanding of the disclosure; the exemplary embodiments of the present disclosure and the description thereof are intended to explain the disclosure, rather than constituting an inappropriate limitation to the present disclosure.

In order to illustrate the technical solution in the embodiments of the present disclosure more clearly, the accompanying drawings required in the description of the embodiments will be briefly described below. Obviously, the accompanying drawings described below are merely some embodiments of the present disclosure, and those skilled in the art can obtain other drawings based on these accompanying drawings without any creative work.

FIG. 9 is an exemplary diagram of a context comparison table according to an embodiment of the present disclosure.

DETAILED DESCRIPTION

The implementation mode of the present disclosure will be illustrated through following specific embodiments. Those skilled in the art can easily understand other advantages and effects of the present disclosure from the disclosure of the present specification. The present disclosure may also be embodied or applied through various other embodiments, and the details of the specification may be modified or transformed based on different views and applications without departing from the spirit of the present disclosure. It should be noted that the following embodiments and limitations in the embodiments may be combined with each other without contradiction.

Some exemplary embodiments of the present disclosure are described for purposes of illustration, and it should be appreciated that the present disclosure can be implemented by other modes not specifically shown in the accompanying drawings.

In a feasible embodiment of the present disclosure, a primitive rendering method is provided. It should be appreciated that existing GPU products have two types of architectures for the primitive rendering, i.e., an Immediate-Mode-Rendering (IMR) architecture and a Tile-Based-Rendering (TBR) architecture.

Figure 1:
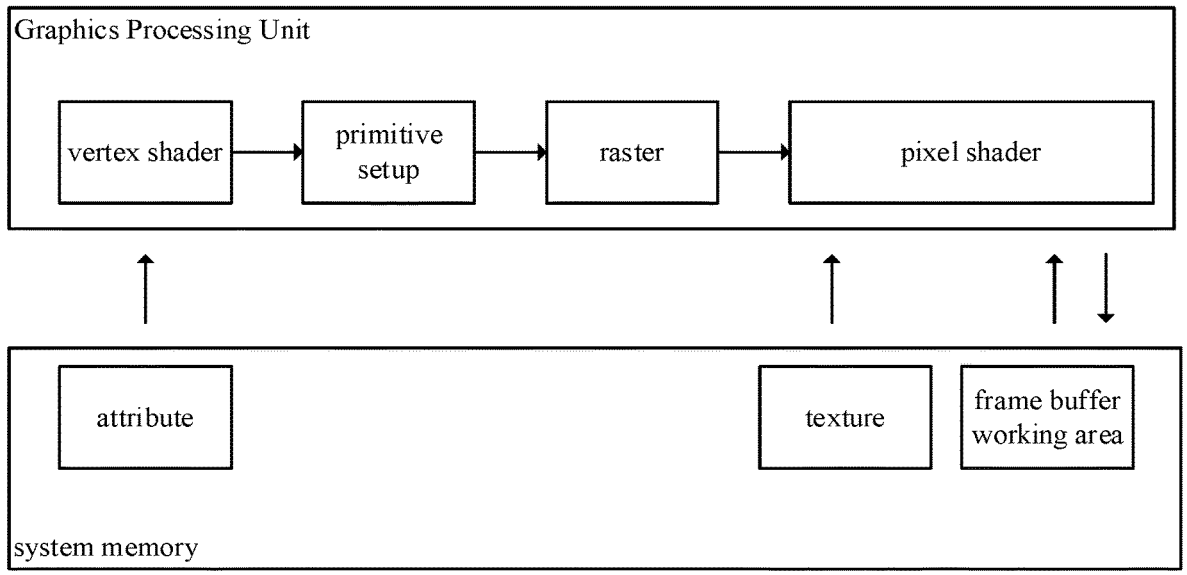
FIG. 1 is a schematic diagram of an IMR architecture of an existing GPU product according to an embodiment of the present disclosure.

Referring to FIG. 1, the IMR architecture of an existing GPU product includes a vertex shader, a primitive setup, a raster, and a pixel shader.

A rendering process mainly includes the following steps. The GPU pre-stores all colors, depths, textures and template data in a system memory before performing the rendering processing. During the rendering, the vertex shader processes each vertex of a geometric object and generates primitive information of each vertex; the primitive information includes position information and attribute information; The primitive setup is configured to set up these vertices into the primitive and generates information for subsequent pipelines, such as edge functions, bounding boxes, attribute change gradients, etc. The raster traverses each vertex of the primitive, maps the primitive into a fragment corresponding to a screen pixel; the fragment includes information of each pixel such as a coordinate, a color, a depth, a normal, a derivative, a texture coordinate, etc. The pixel shader is configured to calculate the above information of the fragment and output a final color value which is written into a frame buffer working area, and the frame buffer working area is displayed on the rendering screen. By means of the above operations, the rendering of the primitive is completed.

Figure 2:
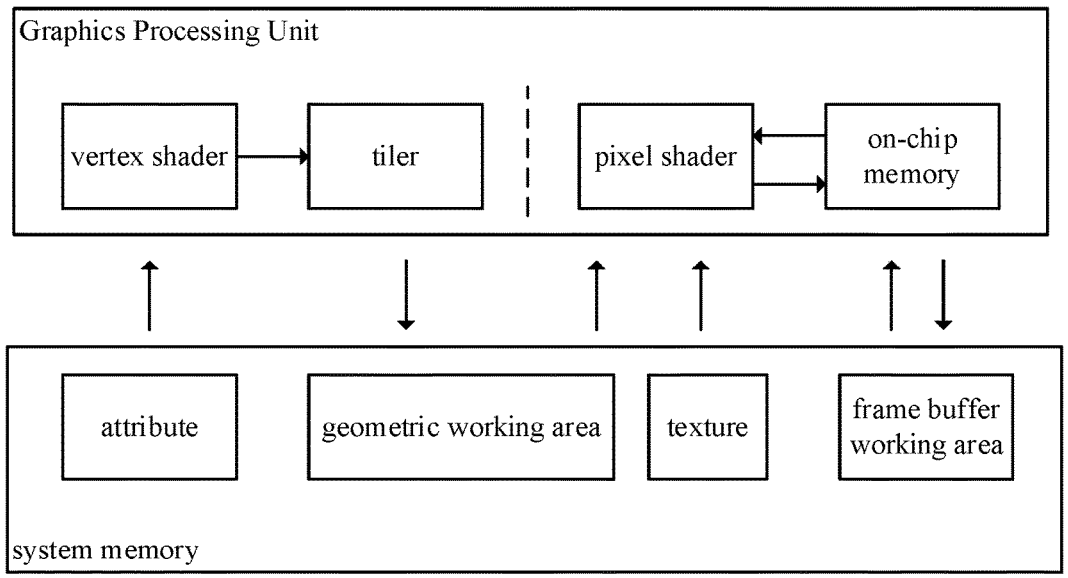
FIG. 2 is a schematic diagram of a TBR architecture of an existing GPU product according to an embodiment of the present disclosure.

Referring to FIG. 2, the TBR architecture of an existing GPU product includes: a vertex shader, a tiler, a pixel shader, and an on-chip memory. A rendering process mainly includes following steps. The screen is tiled by multiple tiles in advance, and the rendering is performed in tiles. The vertex shader processes all vertices and generates primitive information which is temporarily stored in the system memory according to a tile where each vertex is located. The tiler, according to a screen space coordinate of each vertex, outputs a data structure configured to indicate the tile where the vertex is located. After one frame of primitives is stored, the primitives can be rendered tile by tile according to an order of the tiles. The rendering is performed by the raster and the pixel shader. During the rendering, read and write operations for a color buffer, a depth buffer, and a template buffer can be performed on a small on-chip memory without repeated accesses to the system memory. After all primitives in one tile are rendered, the contents of the on-chip memory of the tile are written to the system memory once.

The primitive rendering method in the embodiments of the present disclosure improves the above two rendering processes based on the existing IMR architecture. Specifically, when the primitive information after setup is received, the primitive corresponding to the primitive information is not immediately rendered, but the primitive is first tiled by tiles according to the primitive information; and the tile-based primitive information is not immediately stored into the system memory, but is buffered to the on-chip memory of the GPU. In the process of tiling the primitive into tiles, it is detected in real time whether a preset condition is satisfied; if the preset condition is satisfied, all analyzed primitives on the tile are rendered tile by tile. After one tile is rendered, all primitives on a next tile are rendered until all primitives in each buffered tile are rendered. The details are provided as follows.

Figures 3, 4:
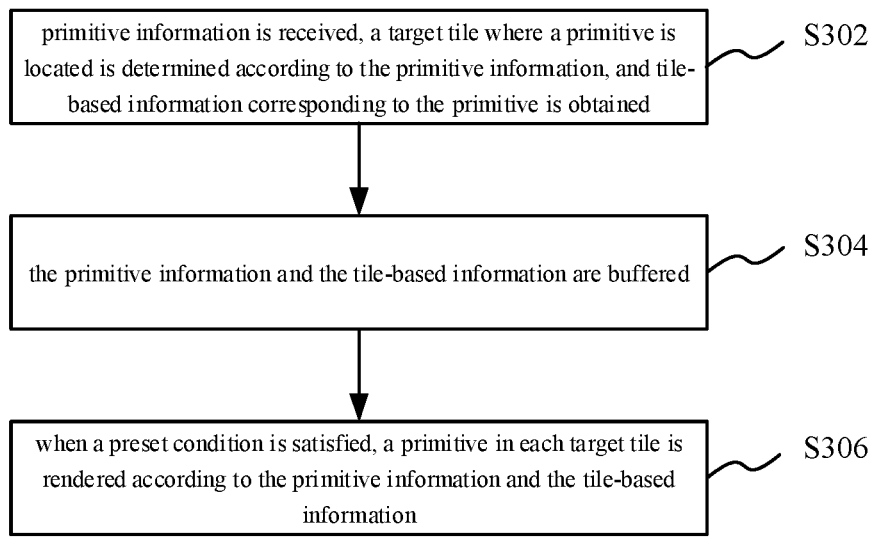
FIG. 3 is a flow chart showing a primitive rendering method according to an embodiment of the present disclosure.
FIG. 4 is an exemplary diagram illustrating sizes of target tiles according to an embodiment of the present disclosure.

Referring to FIG. 3, a primitive rendering method in the embodiments of the present disclosure includes following steps.

Step S302: primitive information is received, a target tile where a primitive is located is determined according to the primitive information, and tile-based information corresponding to the primitive is obtained.

Specifically, the primitive information refers to data associated with vertices of the primitive, including position information and attribute information. It should be appreciated that the Graphics Processing Unit (GPU) is configured to render a primitive provided by the central processing unit (CPU). In order to perform graphic processing operations more easily, the CPU usually partitions frames of the geometric object that needs to display into a plurality of similar basic components, that is, primitives. Since the triangle is the most basic polygon, and any polygon can be converted into multiple triangles, these primitives are usually represented by triangular surfaces, and each vertex of each triangular surface has primitive information associated with it, and the primitive information is applied to subsequent stages of processing.

The screen for rendering the primitive is tiled by a plurality of tiles according to a preset size in advance, when primitive information is received, the primitive is tiled by tiles according to the position information, a tile corresponding to a primitive is determined, and information of the primitive tiled by tiles is recorded to form the tile-based information.

Step S304: the primitive information and the tile-based information are buffered.

Specifically, the primitive buffer is a size-fixed storage area in the on-chip memory of the GPU. The primitive information after setup is temporarily stored in the primitive buffer, and the primitive information corresponding to the primitive in the primitive buffer is read and rendered during the tile loop. The primitive information includes position information and attribute information. In general, the amount of data in the position information is about twice the amount of data in the attribute information. That is, the primitive buffer can store N pieces of position information, or 2N pieces of attribute information. Because the size of the primitive buffer is fixed, the number of primitives that can be stored is affected by the number of attributes. The more the number of attributes of the primitive, the less the number of primitives that can be stored. In practical applications, the size of the primitive buffer can be determined in accordance with specific conditions, such as the application scenario, chip cost, etc.

The tile-based information includes record information configured to record the primitive covering the target tile, and is buffered to a primitive list in the on-chip memory of the GPU.

It should be noted that the term "context" refers to an rendering instructions execution environment, and includes configurations of a rendering pipeline at various stages, which is recorded in a hardware register. The primitives stored in the primitive buffer may correspond to different rendering instructions in the same frame, and each rendering instruction has its own context, so that when a primitive is rendered, it is required to render the primitive in a context corresponding to the primitive.

Accordingly, in a feasible embodiment, the above step S304 further includes: the acquired context information is buffered, in which the context information carries a context attribute, and the context information corresponds to the primitive information.

It should be noted that in general, there are all small primitives to be rendered, for example, in a range of 16 pixels*16 pixels, but there are also large primitives to be rendered. When a primitive is large, the primitive list may be quickly depleted, which is not good to the overall performance. Accordingly, for a small number of large primitives, the large primitive is defined as a global primitive to process. The definition of the global primitive can be determined according to the design and application scenarios of the specific GPU, for example, in the embodiment, a primitive covering more than four tiles is defined as a global primitive.

Accordingly, in a feasible embodiment, the above step S304 further includes: a global primitive is buffered.

Step S306: when a preset condition is satisfied, a primitive in each target tile is rendered according to the primitive information and the tile-based information.

Specifically, the received primitive information and tile-based information are buffered to the on-chip memory of the GPU, and when the preset condition is satisfied, the buffered primitives need to be forcefully rendered. When the primitives are rendered, a piece of tile-based information is found from the primitive list, then a target tile corresponding to the tile-based information is acquired, and then all primitives covered by the target tile are looked for. The primitives in the target tile are rendered in sequence according to the primitive information and the context information of the primitives. After one target tile is completed, another target tile is continuously acquired until all target tiles in the primitive list are completed.

In the above-mentioned primitive rendering method, the primitive corresponding to the primitive information is tiled by tiles and then buffered according to the received primitive information; when the preset condition is satisfied, the buffered primitive is rendered in tiles. With the present disclosure, there is no need to frequently exchange the color information with the system memory, and this is also no need to exchange the primitive tile-based information with the system memory, thereby effectively reducing the data interaction between the on-chip data of the GPU and the system memory. In addition, the technical solution of the present disclosure is based on the existing IMR architecture and can be implemented without the additional intervention of drivers, which is more adapted to the API designs of the OpenGL and Direct3D.

In a feasible embodiment, the target tile in the above step S302 is obtained in advance by tiling the screen configured to render the primitive; and in the embodiment, tile sizes of various target tiles are the same. The purpose is to enable all data in one tile to be stored in the on-chip cache without being replaced during the rendering process of the current tile, and meanwhile the contents cached in the on-chip cache can be fully utilized, that is, to ensure that the tile size is as large as possible while all data in one tile can be stored in the on-chip cache.

In order to achieve the above purpose, the tile size in the embodiment is obtained by calculation based on the size of the on-chip cache, the number of render targets, the format of the tender target, and the number of sample points in a pixel. For example, the tile size can be calculated as follows:

$$\text{Buffer\_size} >= \text{tile\_size} * \text{render\_target\_num} * \text{render\_target\_format\_size} * \text{render\_target\_sample\_num};$$

where Cache_size is a size of the on-chip cache; tile_size is the size of the tile; render_target_num is the number of the render targets; render_target_format_size is the format size of the render target; render_target_sample_num is the number of sample points contained in one pixel of the render target.

Referring to FIG. 4, according to the above calculation mode, for example, when the size of the on-chip cache is equal to 32 KB and the number of render targets is equal to 1, the tile size can be obtained by determining values of the size of the format of the render target and the number of sample points in a pixel (in the MSAA mode).

In a feasible embodiment, the step of determining the target tile where the primitive is located according to the primitive information in the step S302 includes:

the primitive corresponding to the primitive information is tiled according to the position information in the primitive information and the tile size, and the target tile where the primitive corresponding to the primitive information is located is determined.

Specifically, the primitive information includes the position information and the attribute information. One primitive may have 0 or more attributes. After the primitive is set up, the position information includes information such as an edge function, a bounding box of the primitive, etc. The attribute information includes variation gradients of the attribute in the x-direction and y-direction and an attribute value of a seed point. In general, the amount of data in the position information is about twice the amount of data in the attribute information.

Figures 5, 6:
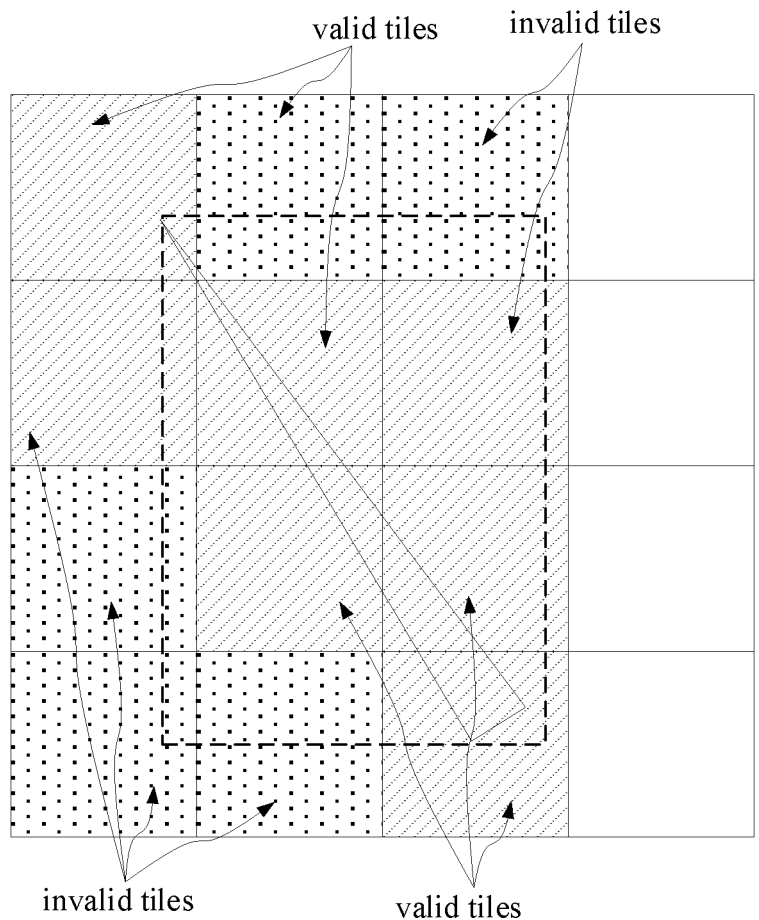
FIG. 5 is an exemplary diagram illustrating a tiling of a primitive by tiles according to an embodiment of the present disclosure.
FIG. 6 is a schematic structural diagram of a primitive buffer according to an embodiment of the present disclosure.

Referring to FIG. 5, a tiling of a primitive by tiles is described below with reference to FIG. 5.

Each time the primitive information after setup is received, the primitive corresponding to the primitive information is tiled in accordance with the preset tile size based on the bounding box of the primitive information, i.e., shown by the dotted lines in FIG. 5. The primitive in the embodiment is tiled by 12 tiles, in which dark tiles are invalid tiles in essence, while light tiles are valid tiles.

Information of these 12 tiles may be recorded as tile-based information of the primitive, and is buffered in the form of a primitive list.

In a feasible embodiment, the step of caching the primitive information in above-mentioned step S304 may further include:

the position information is buffered according to a first order, and the attribute information is buffered according to a second order, in which the first order and the second order are reversed.

Referring to FIG. 6, which is a schematic structure diagram of a primitive buffer in the present embodiment, the position information is stored from a lower order to a higher order, and the attribute information is stored from a higher order to a lower order; meanwhile a storage unit for storing one piece of position information can store two pieces of attribute information. For example, a size of the storage space required to store one piece of position information of one primitive is denoted as Pos_size (bytes), and a size of the storage space required to store one piece of attribute information of one primitive is denoted as Attr_size (bytes), a relationship therebetween satisfies Pos_size=Attr_size*2.

The primitive buffer can store primitive information in a plurality of contexts. The number of attributes of different contexts may be different. Accordingly, when the attribute information is written, the position of the initial attribute information of each context is recorded. For the M-th context, the position of the initial attribute information is denoted as Context_M_attr_base_addr (in Attr_size).

The step of writing the primitive buffer may include follows steps.

Two pointers are set, i.e., a position pointer denoted as pos_wr_ptr and an attribute pointer denoted as attr_wr_ptr. If there are N records in the primitive buffer, a value range of pos_wr_ptr is an integer in [0, N−1], which is initialized as 0; a value range of attr_wr_ptr is an integer in [0, 2N−1], and is initialized as 2N−1.

When a piece of position information is written, the position of pos_wr_ptr is written, the value of pos_wr_ptr is increased by 1, and a moving stride is denoted as Pos_size.

When a piece of attribute information is written, the position of attr_wr_ptr is written, the value of attr_wr_ptr is reduced by 1, and the moving stride is denoted as Attr_ptr.

When satisfying (pos_wr_ptr+1)*2≥attr_wr_ptr, or (attr_wr_ptr−1)≤pos_wr_ptr, it means that the primitive buffer is full.

The step of reading the primitive buffer may include following steps.

The position information is read, specifically, the position information of the K-th primitive is read from a byte address K*Pos_size.

The attribute information is read, specifically, the number of pieces of attribute information of the M-th context is denoted as attr_num, and a byte address of the i-th primitive in this context is as follows:

Attr_byte_addr=(context_M_attr_base_addr−
i*attr_num)*Attr_size.

It should be noted that the number of pieces of attribute information in the context indicates how many attribute values one primitive has, that is, the number of pieces of attribute information corresponding to one piece of position information. The value is fixed for the same context. The value can be the same or different for different contexts.

It should be appreciated that the primitive buffer is updated every time one piece of primitive information is written to the primitive buffer.

In a feasible embodiment, the step of buffering the tile-based information in the above-mentioned step S304 may include: the tile-based information is buffered by using a bitmask representation.

Specifically, the primitive list may include a plurality of pieces of record information. In the embodiment, a piece of record information is denoted as a lane, and a lane records the primitives that cover a target tile. The recording mode is represented by a bitmask. If the n-th primitive covers a current target tile, the n-th bit in the corresponding lane is updated to 1, otherwise 0. The mark recording the covering information is denoted as a Lane Mask. In general, one tile may not be covered by more than 256 primitives, so that the Lane Mask is defined as 256 bits in the embodiment. However, in actual applications, the GPU can adjust the length according to the applicable scenes and its own design.

Figure 7:
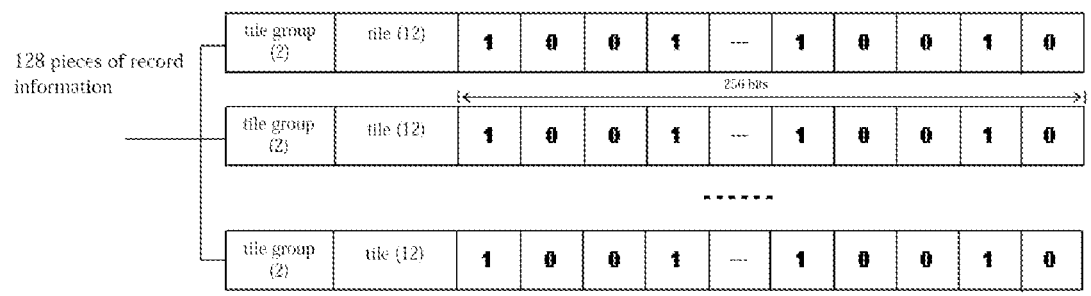
FIG. 7 is an exemplary diagram of a list of primitives according to an embodiment of the present disclosure.

Referring to FIG. 7, Tile_x and Tile_y are adopted to denote a upper-left point coordinate of the tile represented, in addition to recording the Lane Mask in each lane. Furthermore, when one tile is covered by more than 256 primitives, that is, there exists multiple lanes that record the coverage condition of the same tile, the multiple lanes are denoted as Group_id. For example, if prim 0 to prim 255, prim 256 to prim 511, prim 512 to prim 767, and prim 768 to prim 1023 cover the same tile, then four lanes are adopted to record the information. It should be appreciated that in order to facilitate the description of the embodiment, a maximum of four lanes are allowed to record the information for the same tile, and the primitive list in the embodiment includes 128 lanes, which can be set as desired in the actual applications.

It should be appreciated that every time a new piece of tile-based information is written in the primitive list, the primitive list is updated once, and the step of updating the primitive list includes: each received primitive is processed sequentially, a current primitive is tiled by tiles, and it is determined that whether a lane record corresponding to a current tile exists in the primitive list. The Lane Mask in the primitive list is directly updated when there exists a corresponding lane record. A lane is assigned to the current tile when there is no corresponding lane record, and values of Tile_x, Tile_y, and a tile group number Group_id are recorded.

Accordingly, the tile-based information of the global primitive is also stored in the on-chip buffer. In the embodiment, a global mask with 1024 bits is given and denoted as Global_Mask, which is configured to record whether the 1024 primitives are global primitives. If the primitives are global primitives, a corresponding bit is denoted as 1, otherwise it is denoted as 0. It should be appreciated that different GPUs may also define a mask bit width for recording the global primitive according to the actual design.

Figure 8:
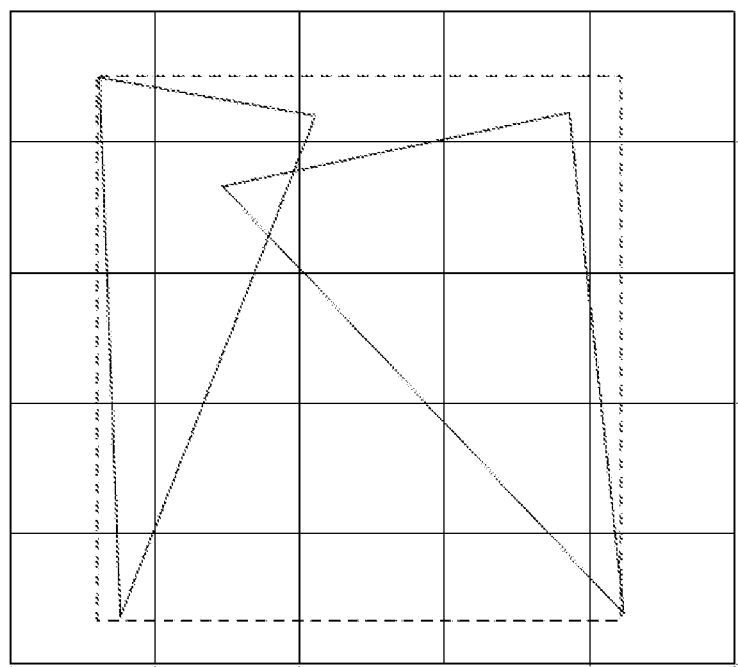
FIG. 8 is an exemplary diagram illustrating a coverage range of a global primitive according to an embodiment of the present disclosure.

Referring to FIG. 8, in the embodiment a set of range information is further adopted to record the coverage range of the global primitive, and the set of range information is denoted as an accumulated bounding box. Each time one global primitive is added, the coverage range is merged with a coverage range of the currently added global primitive. For example, for the two global primitives in FIG. 8, the merged coverage range of the global primitives is a range indicated by the dotted lines.

In a feasible embodiment, the step of caching the context information in the above-mentioned step S304 further includes:

A context buffer is adopted to buffer the context information, and a context table is adopted to record each piece of context information; in the subsequent rendering, a context index corresponding to a primitive is acquired first, a context corresponding to the context index is acquired according to the context index, and then a corresponding content is called from the context buffer to use.

Referring to FIG. 9, each piece of record information stored in the context table includes a first initial position (Ctx_base_address) of a current context in the context buffer, the number of lanes (Ctx_entry_num) in the context buffer occupied by the current context, an index of a first primitive (First_Prim_idx) of the current context, a second initial position of an attribute (Attr_base_addr) corresponding to the current context in the primitive buffer, and the number of attributes (Attr_num) of a primitive in the primitive buffer obtained by calculating with Attr_base_addr.

When an index of a primitive is known, a context in which the primitive is located can be determined according to the index. For example, if the index of the primitive is i, and when satisfying Context (k)·First_Prim_idx≤i<Context (k+1) First_Prim_idx, the i-th primitive belongs to Context (k).

It should be noted that the context table in the embodiment may be set to include 84 records. In actual applications, how many records are required in the context table can be determined in combination with the GPU design and application scenarios.

It should be appreciated that each inputted primitive has corresponding context information, and when the primitive buffer is updated, if a switch is performed between the contexts, the context table and the context buffer are filled in with the corresponding information, and the context table and the context buffer are updated.

In a feasible embodiment, the step of satisfying the preset condition in the above-mentioned step S306 may include following steps.

After the received primitive information and context information are buffered to the on-chip memory, if the storage space on the on-chip memory is full, the rendering is forced. Specifically, in the embodiment, when the primitive information and the context information are buffered, if any one of buffers corresponding to the primitive information and the tile-based information is full, that is to say, any one of the primitive buffer, the primitive list, the context buffer, and the context table in the above embodiment is full, or the processing of the current frame is completed, then the preset condition is considered to be satisfied, and it is required to force the rendering of the buffered primitive.

In a feasible embodiment, the step of rendering the primitive in each target tile according to the tile-based information and the primitive information in the above step S306 may include following steps.

A primitive in each target tile is searched for according to tile-based information; context information corresponding to each primitive in each target tile is acquired, and the primitive in each target tile is rendered according to the primitive information and the context information of each primitive.

Further, the step of acquiring the context information corresponding to each primitive in each target tile may further include:

index information of a primitive covering each target tile is searched for, a corresponding context index is searched for through the index information, and the context information corresponding to each primitive is acquired according to the corresponding context index.

Further, the step of searching for the primitive in each target tile according to the tile-based information may include:

a target tile corresponding to current tile-based information is acquired according to the current tile-based information, tile-based information associated with the current tile-based information is searched for according to the target tile; when there exists the tile-based information associated with the current tile-based information, a first operation result is obtained based on the current tile-based information and the associated tile-based information; the first operation result is analyzed to obtain the primitive in the target tile.

Further, the step of obtaining the first operation result based on the current tile-based information and the associated tile-based information may include:

an OR operation is performed on the current tile-based information and the associated tile-based information, and the first operation result is obtained.

In a feasible embodiment, the tile-based information further includes record information for recording a global primitive; the global primitive refers to a primitive having a coverage range more than a predetermined number of tiles, and the predetermined number is set to four in the present embodiment.

The step of searching for the primitive in each target tile according to the tile-based information may include:

a global primitive associated with the target tile is searched for; when there exists the global primitive associated with the target tile, a second operation result is obtained according to the first operation result and the tile-based information corresponding to the global primitive; the second operation result is analyzed, and a primitive in the tile-based information is obtained.

Further, the step of obtaining the second operation result according to the first operation result and the tile-based information corresponding to the global primitive may include:

the first operation result and the tile-based information corresponding to the global primitive are summed to obtain the second operation result.

When the forced rendering is completed, the context buffer and the context table are cleared.

Figure 10:
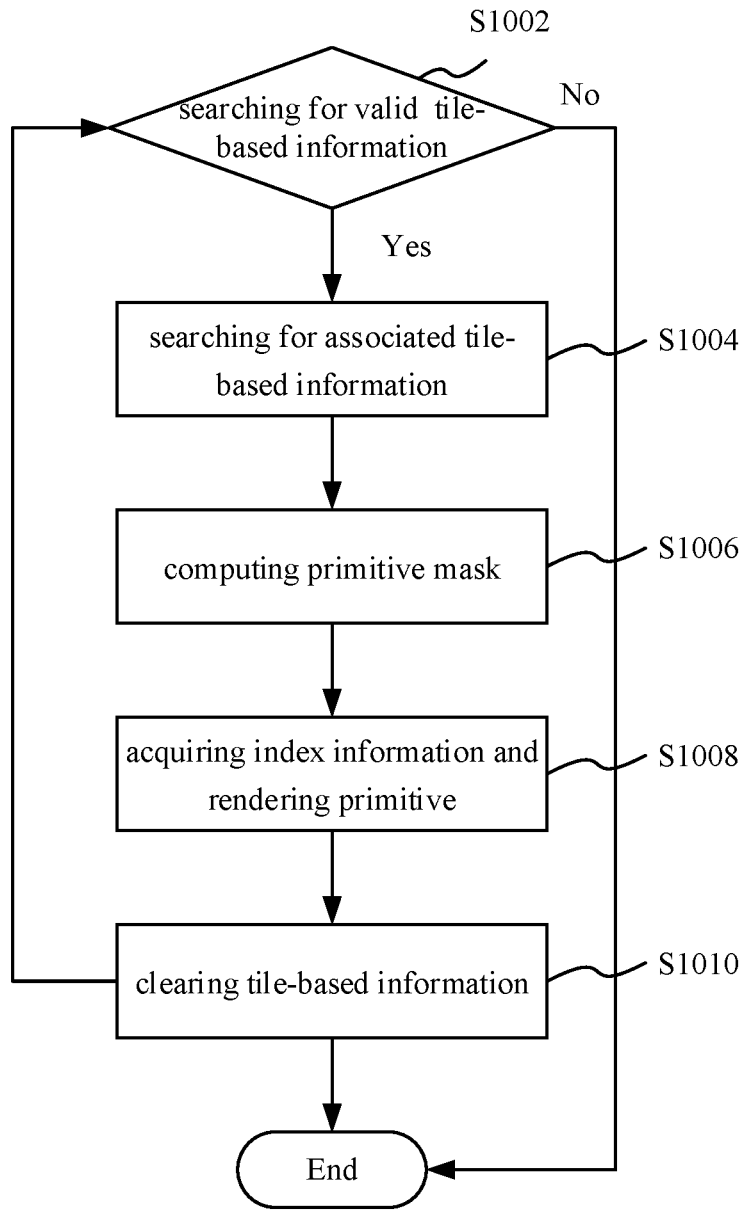
FIG. 10 is a flow chart showing a step S306 according to an embodiment of the present disclosure.

Referring to FIG. 10, the processing flow of the step S306 is described below with reference to FIG. 10.

Step S1002: a lane recording valid tile-based information is searched for in the primitive list; the tile-based information corresponds to a target tile; when there exists a lane recording valid tile-based information, a step S1004 is performed; otherwise, the entire process ends.

Step S1004: tile-based information associated with the valid tile-based information is searched for in the entire primitive list. It should be appreciated that the valid tile-based information and the associated tile-based information are configured to record the same target tile with the same upper-left point coordinate (Tile_x, Tile_y) and different tile group numbers group_id.

Step S1006: primitive masks of all primitives covered by the target tile are calculated.

As for all tile-based information of the target tile, assuming that the Lane Mask for group_id=0 is mask0, the Lane Mask for group_id=1 is mask1, the Lane Mask for group_id=2 is mask2, and the Lane Mask for group_id=3 is mask3, the 1024-bit primitive mask can be calculated as:

Primitive_mask=mask0|(mask1<<256)|(mask2<<512)|(mask3<<768).

In addition, the target tile may be covered by some global primitives, in which case the processing flow of the step S1006 may further include:

the obtained primitive mask Primitive_mask and the obtained global mask Global_mask are summed to obtain the primitive masks of all primitives covered by the target tile; the target tile covered by the global primitive is obtained according to the accumulated bounding box of the global primitive.

Step S1008: the index information of the primitive covered by the target tile is obtained according to the primitive masks of all primitives; information of each primitive covered by the current tile is read sequentially according to the obtained index information of all primitives. Corresponding context information is found, and then rendering is performed.

Step S1010: when all primitives in one tile are processed, related tile-based information in the primitive list is cleared.

It should be appreciated that although the steps in the flow charts of the embodiments described above are shown sequentially as indicated by the arrows, these steps are not definitely performed sequentially in the order indicated by the arrows. Unless specifically stated herein, the execution of these steps is not strictly limited in order, but these steps may be performed in other orders. Furthermore, at least part of the steps in the flow charts as described in the embodiments described above may include a plurality of steps or stages that may not definitely be performed at the same time, but may be performed at different time, and the steps or stages may not definitely be performed sequentially, but may be performed in turns or alternately with other steps or with at least part of the steps or stages of other steps.

Based on the same inventive concept, in an embodiment of the present disclosure, a primitive rendering apparatus for implementing the above-mentioned primitive rendering method is provided. A technical solution for solving the problem provided by the apparatus is similar to the solution of the above method, as for the specific limitations in one or more embodiments of the primitive rendering apparatus provided below, reference cab be made to the limitations on the primitive rendering method, which will not be repeated herein.

Figure 11:
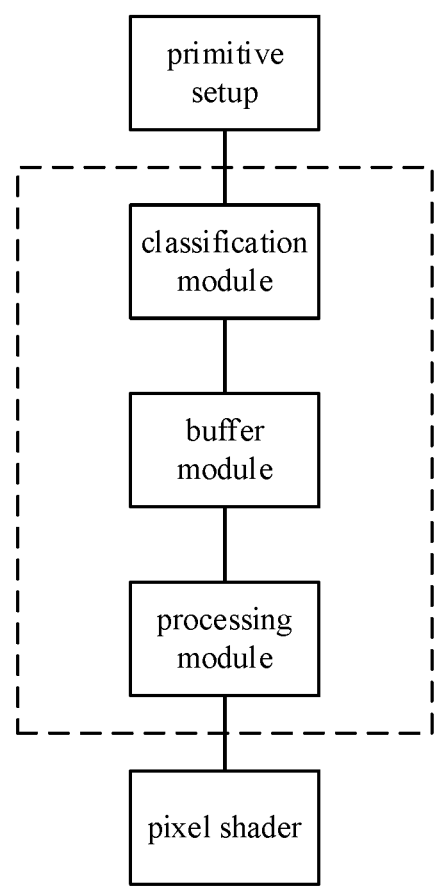
FIG. 11 is a schematic structural diagram of a primitive rendering apparatus according to an embodiment of the present disclosure.

Referring to FIG. 11, in a feasible embodiment of the present disclosure, a primitive rendering apparatus is provided, which includes: a classification module, a buffer module, and a processing module.

The classification module is configured to receive primitive information, determine a target tile in which a primitive is located according to the primitive information, and obtain tile-based information corresponding to the primitive.

Specifically, the classification module is connected to a primitive setup, and receives the primitive information set up. It should be appreciated that the primitive information includes position information and attribute information; after the primitive information is set up, the position information further includes information such as an edge function, a bounding box of the primitive, etc. The attribute information includes variation gradients of the attribute in x- and y-directions and an attribute value of a seed point.

In a feasible embodiment, the step of determining the target tile in which the primitive is located according to the primitive information, and obtaining the tile-based information corresponding to the primitive includes:

the primitive corresponding to the primitive information is tiled according to the position information of the primitive information and a tile size, and the target tile of the primitive corresponding to the primitive information is determined. The target tile is obtained by tiling a screen configured to render the primitive in advance; and in the embodiment, tile sizes of various target tiles are the same. In order to enable all data in one tile to be stored in the on-chip cache without being replaced during the rendering process of the current tile, and meanwhile the contents cached in the on-chip cache can be fully utilized, that is, to ensure that the tile size is as large as possible while all data in one tile can be stored in the on-chip cache. In order to achieve the above purpose, the tile size in the embodiment is obtained by calculating based on the size of the on-chip cache, the number of render targets, the format of the tender target, and the number of sample points in a pixel.

Furthermore, the step of tiling the primitive corresponding to the primitive information according to the position information of the primitive information and the tile size includes:

each time the primitive information set up is received, the primitive corresponding to the primitive information is tiled in accordance with a preset tile size based on a bounding box of the primitive information, the primitive is tiled by a plurality of tiles, in which the related tiles include valid tiles and invalid tiles, record information of the plurality of tiles covering the primitive is recorded to obtain the tile-based information of the primitive.

The buffer module is configured to buffer the primitive information and the tile-based information.

Figure 12:
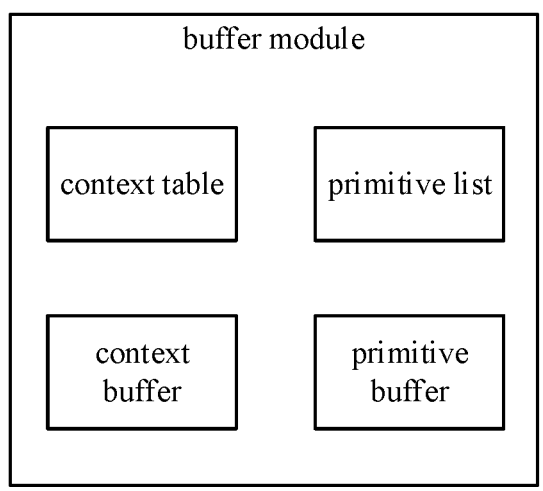
FIG. 12 is a structure tile diagram of a buffer module according to an embodiment of the present disclosure.

Referring to FIG. 12, the buffer module is a size-fixed storage area in the on-chip memory of the GPU, and includes a primitive buffer, a primitive list, a context buffer, and a context table.

The primitive buffer is configured to buffer the primitive information which is set up. The primitive information includes position information and attribute information. In general, the amount of data in the position information is about twice the amount of data in the attribute information. That is, the primitive buffer can store N pieces of position information, or 2N pieces of attribute information. Because the size of the primitive buffer is fixed, the number of primitives that can be stored is affected by the number of attributes. The more the number of attributes of the primitive, the less the number of primitives that can be stored. In practical applications, the size of the primitive buffer can be determined in accordance with specific conditions, such as the applicable scenario, chip cost, etc.

Furthermore, the step of buffering the primitive information includes: the position information is buffered according to a first order, and the attribute information is buffered according to a second order, in which the first order and the second order are reversed. In a specific embodiment, the position information is stored from a lower order to a higher order, and the attribute information is stored from a higher order to a lower order; meanwhile a storage unit for storing one piece of position information can store two pieces of attribute information.

The primitive list is configured to buffer the tile-based information. The step of buffering the tile-based information may include: the tile-based information is buffered by using a bitmask representation.

Specifically, the primitive list may include a plurality of pieces of record information. In the embodiment, a piece of record information is denoted as a lane, and a lane records that one target tile is covered by which primitive. The recording mode is represented by a bitmask. If the n-th primitive covers a current target tile, the n-th bit in the corresponding lane is updated to 1, otherwise 0. The mark for recording the covering information is denoted as a Lane Mask. In general, one tile may not be covered by more than 256 primitives, so that the Lane Mask is defined as 256 bits in the embodiment. However, in actual applications, the GPU can adjust the length according to the applicable scenes and its own design.

In addition, Tile_x and Tile_y are adopted to denote a upper-left point coordinate of the tile represented, in addition to recording the Lane Mask in each lane. Furthermore, when one tile is covered by more than 256 primitives, that is, there exists multiple lanes that record the coverage condition of the same tile, the multiple lanes are denoted as Group_id. For example, if prim 0 to prim 255, prim 256 to prim 511, prim 512 to prim 767, and prim 768 to prim 1023 cover the same tile, then four lanes are adopted to record the information. It should be appreciated that in order to facilitate the description of the embodiment, a maximum of four lanes are allowed to record the information for the same tile, and the primitive list in the embodiment includes 128 lanes, which can be set as desired in the actual applications.

It should be noted that the context refers to an operation environment of rendering instructions, and includes configurations of a rendering pipeline at various stages, which is recorded in a register on the hardware. The primitives stored in the primitive buffer may correspond to different rendering instructions in the same frame, and each rendering instruction has its own context, so that when a primitive is rendered, it is required to render the primitive in a context corresponding to the primitive.

In a feasible embodiment, the buffer module is configured to buffer the acquired context information, in which the context information carries a context attribute, and the context information corresponds to the primitive information.

The context buffer is configured to buffer the context information.

The context table is configured to record each piece of context information. Each piece of record information stored in the context table includes: a first initial position of a current context in the context buffer, the number of lanes in the context buffer occupied by the current context, an index of a first primitive of the current context, a second initial position of an attribute corresponding to the current context in the primitive buffer, and the number of attributes of a primitive in the primitive buffer obtained by calculating with the second initial position. When an index of a primitive is known, a context in which the primitive is located can be determined according to the index, and then the context information is acquired from the context buffer.

It should be noted that in general, there are all smaller primitives to be rendered, for example, in a range of 16 pixels*16 pixels, but there are also larger primitives to be rendered. When a primitive is large, the primitive list may be quickly depleted, which is not good to the overall performance. Accordingly, for a small number of large primitives, the large primitive is defined as a global primitive to process. The definition of the global primitive can be determined according to the design and application scenarios of the specific GPU, for example, in the embodiment, a primitive covering more than four tiles is defined as a global primitive.

In a feasible embodiment, the buffer module is further configured to buffer the global primitive.

Accordingly, the tile-based information of the global primitive is also stored in the on-chip buffer. In the embodiment, a global mask with 1024 bits is given and denoted as Global_Mask, which is configured to record whether the 1024 primitives are global primitives. If the primitives are global primitives, a corresponding bit is denoted as 1, otherwise it is denoted as 0. It should be appreciated that different GPUs may also define a mask bit width for recording the global primitive according to the actual design. In addition, in the embodiment a set of range information is further adopted to record the coverage range of the global primitive, and the set of range information is denoted as an accumulated bounding box. Each time one global primitive is added, the coverage range is merged with a coverage range of the currently added global primitive.

The processing module is configured to render the primitive in each target tile according to the primitive information and the tile-based information when the preset condition is satisfied.

In a feasible embodiment, the processing module is configured to determine whether the preset condition is satisfied. Specifically, when the buffer module buffers the primitive information and the context information, the processing module detects in real time whether any one of buffers corresponding to the primitive information and the tile-based information is full, i.e., any one of the primitive buffer, the primitive list, the context buffer, and the context table in the above embodiment is full, or the processing of the current frame is completed, and then the processing module determines that the preset condition is satisfied, and force the rendering of the buffered primitive.

In a feasible embodiment, the step of rendering the primitive in each target tile according to the tile-based information and the primitive information may include:
  a primitive in each target tile is searched for according to tile-based information; context information corresponding to each primitive in each target tile is acquired, and the primitive in each target tile is rendered according to the primitive information and the context information of each primitive until all tile-based information in the primitive list is completed.

Furthermore, the step of acquiring the context information corresponding to each primitive in each target tile may further include:
  index information of a primitive covering each target tile is searched for, a corresponding context index is searched for through the index information, and the context information corresponding to each primitive is acquired according to the corresponding context index.

Furthermore, the step of searching for the primitive in each target tile according to the tile-based information may include:
  a target tile corresponding to current tile-based information is acquired according to the current tile-based information, tile-based information associated with the current tile-based information is searched for according to the target tile; when there exists the tile-based information associated with the current tile-based information, a first operation result is obtained based on the current tile-based information and the associated tile-based information; the first operation result is analyzed to obtain the primitive in the target tile.

Furthermore, the step of obtaining the first operation result based on the current tile-based information and the associated tile-based information may include:
  an OR operation is performed between the current tile-based information and the associated tile-based information, and the first operation result is obtained.

In a feasible embodiment, the tile-based information further includes record information for recording a global primitive; the global primitive refers to a primitive having a coverage range more than a predetermined number of tiles, and the predetermined number is set to four in the present embodiment.

The step of searching for the primitive in each target tile according to the tile-based information when there exists the global primitive may include:

a global primitive associated with the target tile is searched for; when there exists the global primitive associated with the target tile, a second operation result is obtained according to the first operation result and the tile-based information corresponding to the global primitive; the second operation result is analyzed, and a primitive in the tile-based information is obtained.

Furthermore, the step of obtaining the second operation result according to the first operation result and the tile-based information corresponding to the global primitive may include:

the first operation result and the tile-based information corresponding to the global primitive are summed to obtain the second operation result.

The second operation result is analyzed, and the primitive in the target tile is obtained.

The step of rendering the primitive in each target tile may include:

a raster is adopted to traverse each vertex of the primitive, map the primitive into a fragment corresponding to a screen pixel; the fragment includes information of each pixel such as a coordinate, a color, a depth, a normal, a derivative, a texture coordinate, etc. Information of the above fragment is transmitted to a pixel shader to output a final color value.

After the forced rendering is completed, the context buffer and the context table are cleared, and next buffering is continued.

Figure 13:
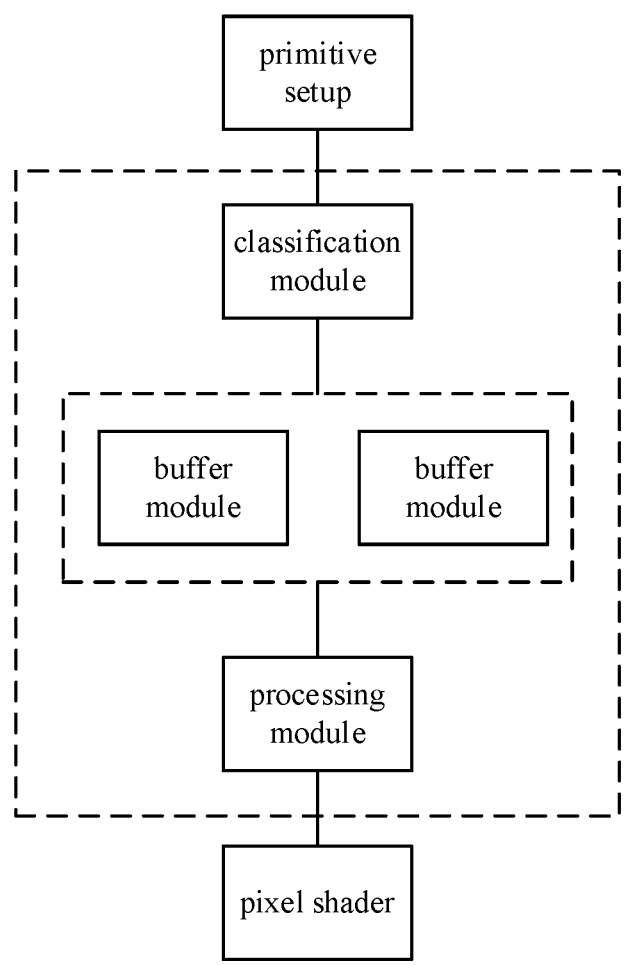
FIG. 13 is a schematic structural diagram of a primitive rendering apparatus according to an embodiment of the present disclosure.

Referring to FIG. 13, in a feasible embodiment of the present disclosure, the primitive rendering apparatus includes a plurality of buffer modules. In a specific embodiment, two buffer modules are provided. When one buffer module receives output information of the primitive setup, the other buffer module can provide the primitive for the subsequent processing module to render; the two buffer modules operate alternately to avoid an idle state of the pipeline of the GPU.

With the above-mentioned primitive rendering apparatus, the primitive corresponding to the primitive information is tiled by tiles according to the received primitive information before buffering, when the preset condition is satisfied, the buffered primitive is rendered in tiles. In the present disclosure, there is no need to frequently exchange the color information with the system memory, and this is also no need to exchange the primitive tile-based information with the system memory, thereby effectively reducing the data interaction between the on-chip data of the GPU and the system memory. In addition, the technical solution of the present disclosure is based on the existing IMR architecture and can be implemented without the additional intervention of drivers, which is more adapted to the API designs of the OpenGL and Direct3D.

Each of the modules in the above-mentioned primitive rendering apparatus may be implemented in whole or in part by software, hardware, and combination thereof. The modules may be embedded in hardware or independently of the processor in the computer device, or may be stored in software in the memory of the computer device to facilitate the processor to invoke and perform operations corresponding to the above various modules.

Figure 14:
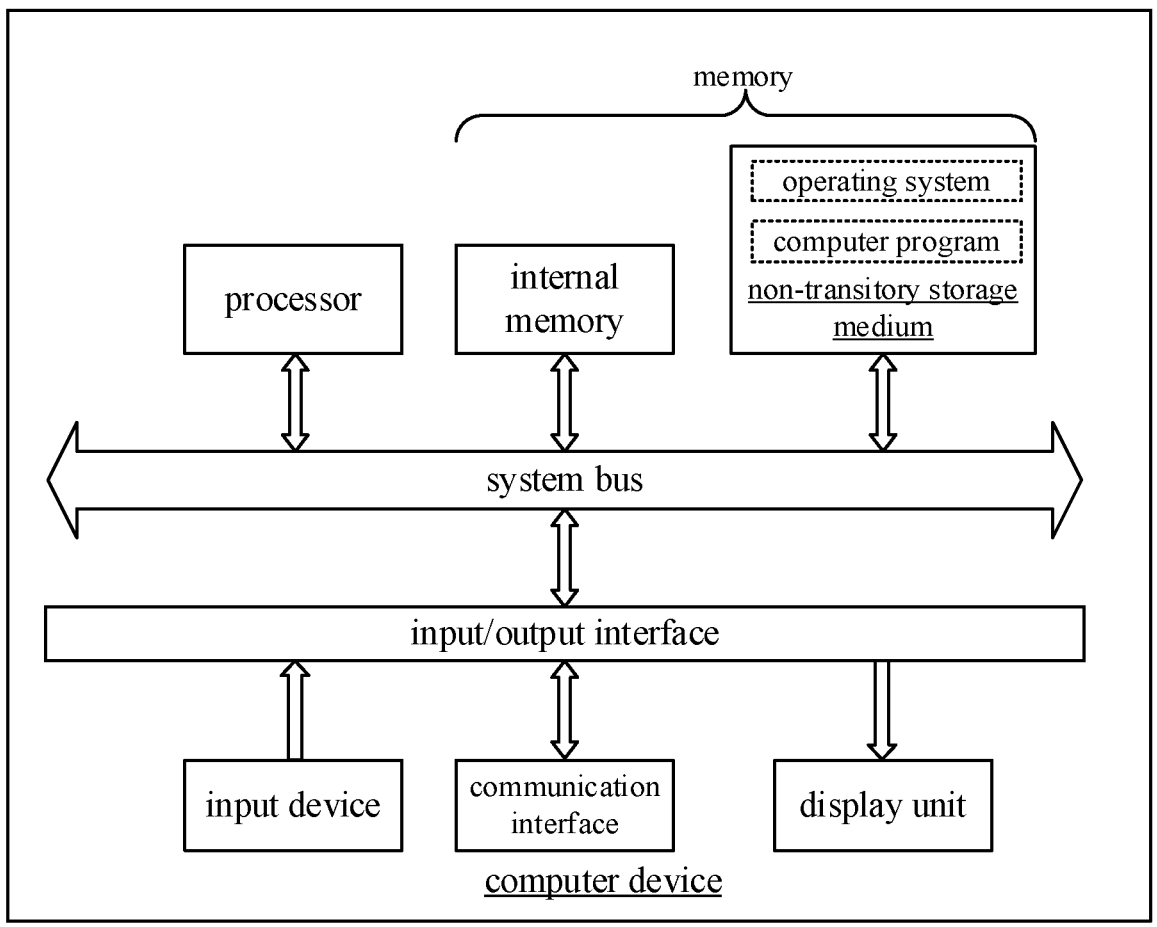
FIG. 14 is a diagram of an internal structure of a computer device according to an embodiment of the present disclosure.

In a feasible embodiment, a computer device is provided, which may be a terminal, and an internal structure diagram thereof may be as shown in FIG. 14. The computer device may include a processor, a memory, an input/output interface, a communication interface, a display unit and an input device. The processor, the memory, and the input/output interface are connected through a system bus; the communication interface, the display unit and the input device are connected to the system bus through the input/output interface. The processor of the computer device is configured to provide computing and control capabilities. The memory of the computer device includes a non-transitory storage medium and an internal memory. The non-transitory storage medium stores an operating system and a computer program. The memory provides an operating environment for the operating system and the computer program in non-transitory storage medium. The input/output interface of the computer device is configured to exchange information between the processor and an external device. The computer program is executed by the processor to implement a primitive rendering method. The display unit of the computer device is configured to form a visually visible picture, which can be a display screen, a projection device, or a virtual reality imaging device. The display screen can be a liquid crystal display screen or an electronic ink display screen; and the input device of the computer device can be a touch layer covering the display screen, or a button, a trackball or a touch pad arranged on the housing of the computer device, can also be an externally connected keyboard, a touch pad or a mouse, etc.

Those skilled in the art may appreciate that the structure shown in FIG. 14 is merely a block diagram of a partial structure related to the technical solution of the present disclosure, and does not constitute a limitation to the computer device to which the present disclosure is applied. The specific computer device may include more or less components than shown in the drawings, or may combine certain components, or may have different component arrangements.

In a feasible embodiment, a computer device is provided, which includes a processor and a memory for storing a computer program, and the processor, when executing the computer program, performs the steps in the above-mentioned method embodiments.

In a feasible embodiment, a computer-readable storage medium is provided, on which a computer program is stored, the steps in the above-mentioned method embodiments are performed when the computer program is executed by a processor.

In a feasible embodiment, a computer program product is provided, which includes a computer program, the steps in the above-mentioned method embodiments are performed when the computer program is executed by a processor.

Those of ordinary skill in the art can understand that all or part of the procedures in the method of the above embodiments can be implemented by instructing relevant hardware through a computer program, and the computer program can be stored in a non-transitory computer-readable storage medium, when the computer program is executed, the procedures in the above-mentioned method embodiments can be performed. Any reference to a memory, a database or other media used in the various embodiments provided in the present disclosure may include at least one of a non-transitory memory and a transitory memory. The non-transitory memory may include a Read-Only Memory (ROM), a magnetic tape, a floppy disk, a flash memory, an optical memory, a high-density embedded non-transitory memory, a resistive memory (ReRAM), a Magnetoresistive Random Access Memory (MRAM), a Ferroelectric Random Access Memory (FRAM), a Phase Change Memory (PCM), a graphene memory, etc. The transitory memory may include a Random Access Memory (RAM) or an external cache memory, and the like. As an illustration and not a limitation, the RAM may be in various forms, such as a Static Random Access Memory (SRAM) or a Dynamic Random Access Memory (DRAM). The database involved in the various embodiments provided in the present disclosure may include at least one of a relational database and a non-relational database. The non-relational database may include a tilechain-based distributed database, etc., but is not limited thereto. The processor involved in the various embodiments provided in the present disclosure may be a general-purpose processor, a central processing unit, a graphics processor, a digital signal processor, a programmable logic device, a data processing logic device based on quantum computation, etc., but is not limited thereto.

The technical limitations in the above embodiments can be combined arbitrarily. In order to make the description concise, all possible combinations of the technical limitations in the above embodiments are not described. However, as long as there is no contradiction in the combination of these technical limitations, theses combinations considered to fall within the scope of the present disclosure.

The above-mentioned embodiments merely some exemplary embodiments of the present disclosure, and the descriptions thereof are relatively specific and detailed, but should not be construed as a limitation on the scope of the present disclosure. It should be pointed out that those skilled in the art can make several modifications and improvements without departing from the concept of the present disclosure, which all belong to the protection scope of the present disclosure. Therefore, the scope of protection of the present disclosure is subject to the appended claims.

What is claimed is:

1. A primitive rendering method, comprising:
    receiving primitive information, determining a target tile in which a primitive is located according to the primitive information, obtaining tile-based information corresponding to the primitive, wherein the tile-based information identifies one or more tiles covered by the primitive, and wherein the one or more tiles comprise the target tile;
    buffering the primitive information and the tile-based information;
    determining whether a preset condition is satisfied; and
    in response to determining the preset condition is satisfied, rendering a primitive in each target tile according to the primitive information and the tile-based information;
    wherein the tile-based information comprises record information for recording the primitive covering the target tile;
    wherein the buffering the tile-based information comprises: buffering the record information by using a bitmask representation;
    the method further comprising: acquiring context information corresponding to the primitive information, wherein the context information carries a context attribute; and buffering the context information;
    wherein the rendering the primitive in each target tile according to the primitive information and the tile-based information comprises: searching for the primitive in each target tile according to the tile-based information; acquiring context information corresponding to each primitive in each target tile, and rendering the primitive in each target tile according to the primitive information and the context information of each primitive;
    wherein the searching for the primitive in each target tile according to the tile-based information comprises: acquiring the corresponding target tile according to current tile-based information; searching for tile-based information associated with the current tile-based information according to the target tile; when there exists the tile-based information associated with the current tile-based information, obtaining a first operation result based on the current tile-based information and the associated tile-based information; and analyzing the first operation result to obtain the primitive in the target tile;
    wherein the tile-based information further comprises record information for recording a global primitive, the global primitive refers to a primitive having a coverage range more than a predetermined number of tiles;
    wherein the searching for the primitive in each target tile according to the tile-based information further comprises: searching for a global primitive associated with the target tile;
    when there exists the global primitive associated with the target tile, obtaining a second operation result according to the first operation result and tile-based information corresponding to the global primitive; and analyzing the second operation result to obtain the primitive in the tile-based information.

2. The method according to claim 1, wherein the primitive information comprises position information;
    wherein the determining the target tile in which the primitive is located according to the primitive information comprises:
    tiling the primitive corresponding to the primitive information according to the position information and a tile size, determining the target tile in which the tiled primitive is located; and
    wherein a screen for rendering the primitive comprises a plurality of pre-tiled tiles, the tile size is obtained by calculating based on a size of an on-chip cache, the number of render targets, formats of the render targets, and the number of sample points in a pixel.

3. The method according to claim 1, wherein the primitive information comprises position information and attribute information; and
    wherein the buffering the primitive information comprises:
    buffering the position information according to a first order, buffering the attribute information according to a second order, wherein the first order refers to an order from a lower bit position to a higher bit position, and the second order refers to an order from the higher bit position to the lower bit position, the first order and the second order are reversed.

4. The method according to claim 1, wherein the obtaining the first operation result based on the current tile-based information and the associated tile-based information comprises:
    performing an OR operation on the current tile-based information and the associated tile-based information to obtain the first operation result.

5. The method according to claim 1, wherein the obtaining the second operation result according to the first operation result and the tile-based information corresponding to the global primitive comprises:

summing the first operation result and the tile-based information corresponding to the global primitive to obtain the second operation result.

6. The method according to claim 1, wherein the acquiring the context information corresponding to each primitive in each target tile comprises:
searching for index information of a primitive covering each target tile;
searching for a corresponding context index through the index information; and
acquiring context information corresponding to each primitive according to the corresponding context index.

7. The method according to claim 1, further comprising:
after buffering the tile-based information and the primitive information,
detecting whether any one of buffers corresponding to the primitive information and the tile-based information is full, or whether processing of a current frame is completed; and
when any one of the buffers corresponding to the primitive information and the tile-based information is full, or the processing of the current frame is completed, determining that the preset condition is satisfied.

8. The method according to claim 1, further comprising:
when the primitive information changes, updating the tile-based information corresponding to the primitive information.

9. A primitive rendering apparatus, comprising:
a processor and a memory storing computer instructions executed by the processor,
wherein the processor is configured to:
receive primitive information, determine a target tile in which a primitive is located according to the primitive information, and obtain tile-based information corresponding to the primitive, wherein the tile-based information identifies one or more tiles covered by the primitive, and wherein the one or more tiles comprise the target tile;
buffer the primitive information and the tile-based information;
determine whether a preset condition is satisfied, and to render the primitive in each target tile according to the primitive information and the tile-based information in response to determining the preset condition is satisfied;
wherein the tile-based information comprises record information for recording the primitive covering the target tile;
wherein the processor is further configured to be capable of executing the stored computer instructions to buffer the record information by using a bitmask representation;
wherein the processor is further configured to be capable of executing the stored computer instructions to: acquire context information corresponding to the primitive information, wherein the context information carries a context attribute; and buffer the context information;
wherein the processor is further configured to be capable of executing the stored computer instructions to: search for the primitive in each target tile according to the tile-based information;
acquire context information corresponding to each primitive in each target tile, and render the primitive in each target tile according to the primitive information and the context information of each primitive;
wherein the processor is further configured to be capable of executing the stored computer instructions to: acquire the corresponding target tile according to current tile-based information; search for tile-based information associated with the current tile-based information according to the target tile; when there exists the tile-based information associated with the current tile-based information, obtain a first operation result based on the current tile-based information and the associated tile-based information; and analyze the first operation result to obtain the primitive in the target tile;
wherein the tile-based information further comprises record information for recording a global primitive, the global primitive refers to a primitive having a coverage range more than a predetermined number of tiles;
wherein the processor is further configured to be capable of executing the stored computer instructions to: search for a global primitive associated with the target tile; when there exists the global primitive associated with the target tile, obtain a second operation result according to the first operation result and tile-based information corresponding to the global primitive; and analyze the second operation result to obtain the primitive in the tile-based information.

10. A computer device, comprising a processor and a memory for storing a computer program, wherein the processor, when executing the computer program, implements the method of claim 1.

11. A non-transitory computer-readable storage medium, on which a computer program is stored, wherein when the computer program is executed by a processor, the method of claim 1 is implemented.

12. A computer program product, comprising a non-transitory computer-readable storage medium on which a computer program is stored, wherein the computer program, implements the method of claim 1.

* * * * *